United States Patent
Peng et al.

(10) Patent No.: US 8,429,447 B2
(45) Date of Patent: Apr. 23, 2013

(54) SYSTEM AND METHOD FOR PROVIDING INDEXING WITH HIGH AVAILABILITY IN A NETWORK BASED SUITE OF SERVICES

(75) Inventors: Hailin Peng, Beijing (CN); Zhenghua Xu, Beijing (CN); Xiaowei Yuan, Beijing (CN); Dongzhu Shi, Beijing (CN)

(73) Assignee: CA, Inc., Islandia, NY (US)

( * ) Notice: Subject to any disclaimer, the term of this patent is extended or adjusted under 35 U.S.C. 154(b) by 451 days.

(21) Appl. No.: 12/729,843

(22) Filed: Mar. 23, 2010

(65) Prior Publication Data

US 2011/0239037 A1   Sep. 29, 2011

(51) Int. Cl.
*G06F 11/07* (2006.01)

(52) U.S. Cl.
USPC .................. 714/4.11; 714/3; 714/6.3; 714/13

(58) Field of Classification Search ............. 714/3, 4.11, 714/6.3, 13
See application file for complete search history.

(56) References Cited

U.S. PATENT DOCUMENTS

| | | | |
|---|---|---|---|
| 5,652,908 A | 7/1997 | Douglas et al. | 395/800 |
| 5,812,751 A | 9/1998 | Ekrot et al. | 395/182.02 |
| 5,852,724 A | 12/1998 | Glenn, II et al. | 395/200.69 |
| 8,135,732 B2 | 3/2012 | Peng et al. | 707/769 |
| 2004/0153757 A1 | 8/2004 | Blakeney | 714/13 |
| 2005/0071195 A1* | 3/2005 | Cassel et al. | 705/2 |
| 2005/0223047 A1* | 10/2005 | Shah et al. | 707/201 |
| 2006/0101081 A1* | 5/2006 | Lin et al. | 707/200 |
| 2007/0055765 A1 | 3/2007 | Lisiecki et al. | 709/223 |
| 2007/0168500 A1* | 7/2007 | D'Souza et al. | 709/224 |
| 2007/0220323 A1 | 9/2007 | Nagata | 714/13 |
| 2008/0077636 A1* | 3/2008 | Gupta et al. | 707/204 |
| 2008/0133300 A1* | 6/2008 | Jalinous | 705/7 |
| 2008/0294648 A1* | 11/2008 | Lin et al. | 707/10 |
| 2009/0024416 A1* | 1/2009 | McLaughlin et al. | 705/3 |
| 2009/0292930 A1 | 11/2009 | Marano et al. | 713/189 |
| 2011/0066611 A1* | 3/2011 | Groeneveld et al. | 707/723 |
| 2011/0173491 A1 | 7/2011 | Takamoto et al. | 714/4.11 |
| 2011/0219019 A1 | 9/2011 | Peng et al. | 707/769 |
| 2011/0225165 A1* | 9/2011 | Burstein | 707/741 |
| 2011/0289046 A1* | 11/2011 | Leach et al. | 707/602 |
| 2012/0221526 A1 | 8/2012 | Peng et al. | 707/654 |

* cited by examiner

*Primary Examiner* — Chae Ko
(74) *Attorney, Agent, or Firm* — Pillsbury Winthrop Shaw Pittman LLP

(57) ABSTRACT

A suite of network-based services, such as the services corresponding to Microsoft® SharePoint™, are provided to users with high availability. The suite of network-based services may include browser-based collaboration functions, process management functions, index and search functions, document-management functions, and/or other functions. In particular, the indexing service associated with the suite of network-based services may be provided with high availability.

15 Claims, 2 Drawing Sheets

US 8,429,447 B2

SYSTEM AND METHOD FOR PROVIDING INDEXING WITH HIGH AVAILABILITY IN A NETWORK BASED SUITE OF SERVICES

FIELD OF THE INVENTION

The invention relates to providing network-based services to users with high availability, and, in particular, to providing Microsoft® SharePoint™ services, specifically the indexing service, with high availability by replacing a de-activated indexing service with a newly activated indexing service in other services referring to the indexing service when failover or switchover is made.

BACKGROUND OF THE INVENTION

Microsoft® SharePoint™ may be a rich enterprise server application that provides full content management features, implement business processes, and/or provide access to information related to organizational goals and/or processes.

High availability may be a system design protocol that ensures a certain degree of operational continuity. Conventional configurations of Microsoft® SharePoint™ may be challenged to meet high availability standards for a variety of reasons. For example, queries to determined updated configuration parameters of a Microsoft® SharePoint™ server may be slow and inefficient to the point of dramatically inhibiting performance of the server.

SUMMARY

One aspect of the invention relates to providing a suite of network-based services, such as the services corresponding to Microsoft® SharePoint™, to users with high availability. The suite of network-based services may include browser-based collaboration functions, process management functions, index and search functions, document-management functions, and/or other functions. In particular, the indexing service associated with the suite of network-based services may be provided with high availability.

In some implementations, a system configured to provide a suite of network-based services to users with high availability includes a first set of one or more servers, a second set of one or more servers, and a shared service provider. The suite of network-based services may include browser-based collaboration functions, process management functions, index and search functions, document-management functions, and/or other functions. The suite of network-based services may correspond to services provided by, for example, Microsoft® SharePoint™ software elements being executed on one or more processors.

The first set of servers may be configured to execute one or more of a first server application module, a synchronization module, and/or other modules. The second set of servers may be configured to execute one or more of a second server application module, a second synchronization module, a replacement module, and/or other modules. The shared service provider may include one or more servers configured to provide one or more shared services to the first set of servers, the second set of servers, and/or other servers.

The first server application module may be configured to provide a first instance of a server application. As used herein, the term "server application" may refer to one or more software elements that cooperate in an integrated manner to provide the network-based services associated with the first set of servers to users. For example, the first server application module may include the collection of software elements available from Microsoft® SharePoint™ 2007.

The first server application module may include a first indexing sub-module and/or other sub-modules. The first indexing sub-module may be configured to provide an indexing service to the first server application module (and/or other instances of the server application). As such, the indexing sub-module may index information served by the first server application module, metadata related to information served by the first server application module, information associated with one of the other shared services provided by the first shared services provider module, and/or other information. The indexing sub-module may crawl content, logs, and/or other information sources associated with the first server application module (and/or other instances of the server application), the shared service provider (and/or other shared services providers), and/or other information and create an index in an ongoing manner. This index may be referenced (e.g., by the services of the shared services provider) to respond to queries and/or searches by users, administrators, for the functionality of shared services, and/or for other purposes The shared services provider may be configured to provide shared services to the server application (e.g., as instanced on the first set of servers and/or the second set of servers). The shared services provided by the shared services provider may be services that are utilized across the web sites, web applications, and/or databases served by the server application modules. In some implementations, the shared services provider may include the Shared Service Providers associated with Microsoft® SharePoint™ 2007, and/or other Microsoft® SharePoint™ releases. To provide the shared services, the shared services provider may include one or more processors configured to execute computer program modules. The computer program modules may include one or more of a user information module, a business data catalog module, a spreadsheet services module, a search usage module, a project management module, and/or other sub-modules.

In some implementations, the shared services provider may be associated with a single indexing module (e.g., the first indexing sub-module) to obtain access to an index. However, a single indexing module may provide its index to a plurality of shared service providers and/or other modules or sub-modules. The shared services and/or shared service providers associated with the indexing sub-module may store a locator (e.g., a network address, File Share location, and/or other locators) that point to the indexing sub-module so that they can access the index created and/or maintained by the indexing sub-module when needed.

This reliance of a plurality of services, shared service providers, and/or other modules or sub-modules on the indexing sub-module may create issues when switchover or failover from the first set of servers to the second set of servers occurs. The issues may be caused by one or more shared services, shared service providers and/or other modules or sub-modules pointing to the indexing sub-module of the first set of servers after the switchover or failover even after the indexing sub-module of the first set of servers has been de-activated by virtue of the switchover or failover.

The synchronization module may be configured to obtain configuration parameters of the first server application module. The synchronization module may transmit the configuration parameters to the second set of servers. The configuration parameters may include index parameters of an index of information and/or metadata created and/or maintained by the indexing sub-module, identifications of one or more shared service providers, modules, or sub-modules that refer to the index created and/or maintained by the indexing sub-module, and/or other information associated with the index created and/or maintained by the indexing sub-module. The indexing parameters obtained and transmitted by the synchronization module may facilitate the duplication of the index on the second set of servers. The identifications of the one or more shared service providers, modules, and/or sub-modules that refer to the index may include locators that provide access to the one or more shared service providers, modules, and/or sub-modules, or may enable the appropriate locators to be obtained via some sort of look-up.

The second server application module, executed on the second set of servers, may be configured to provide a second instance of the server application. For example, the second server application module may include the collection of software elements available from Microsoft® SharePoint™ 2007. Similar to the first server application module, the second server application module may be configured such that the second instance of the server application provides application programming interfaces through which the second server application module communicates with other computer program modules that are not an integral part of the second server application module. The second server application module may include a second indexing sub-module that corresponds to the indexing sub-module executed on the first set of servers. The second indexing sub-module may provide backup for the indexing sub-module executed on the first set of servers. This backup may be provided with high availability.

The second synchronization module may be configured to receive the some or all of the configuration parameters transmitted to the second set of servers from the synchronization module of the first set of servers. These may include the indexing parameters related to the index created and/or maintained by the indexing sub-module of the first set of servers. The second synchronization module may provide the received indexing parameters to the second indexing sub-module.

The second indexing sub-module may be configured to maintain an index according to the received indexing parameters. This index may provide a backup to the index created and/or maintained by the indexing sub-module of the first set of servers. The index maintained by second indexing sub-module may be maintained to accommodate switchover or failover of the indexing sub-module of the first set of servers with high availability.

The replacement module may be configured to ensure that upon failover or switchover, any shared service providers, modules, or sub-modules previously referring to the index created and/or maintained by the indexing sub-module of the first set of servers will begin to refer to the index maintained by second indexing sub-module. As such, the replacement module may replace the associations with the indexing sub-module of the shared service provider included in the system with associations to the second indexing sub-module. The replacement module may determine that the shared service provider needs to be adjusted in this manner based on the configuration information received at the second set of servers from the synchronization module of the first set of servers.

Since the functionality provided by the replacement module is provided by the servers being activated during switchover or failover, the transition can be made from the indexing sub-module of the first set of servers to the second indexing sub-module even if the transition was not anticipated and/or impacts the processor executing the indexing sub-module of the first set of servers. Thus, the transition between these indexing sub-modules can be made with high availability.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
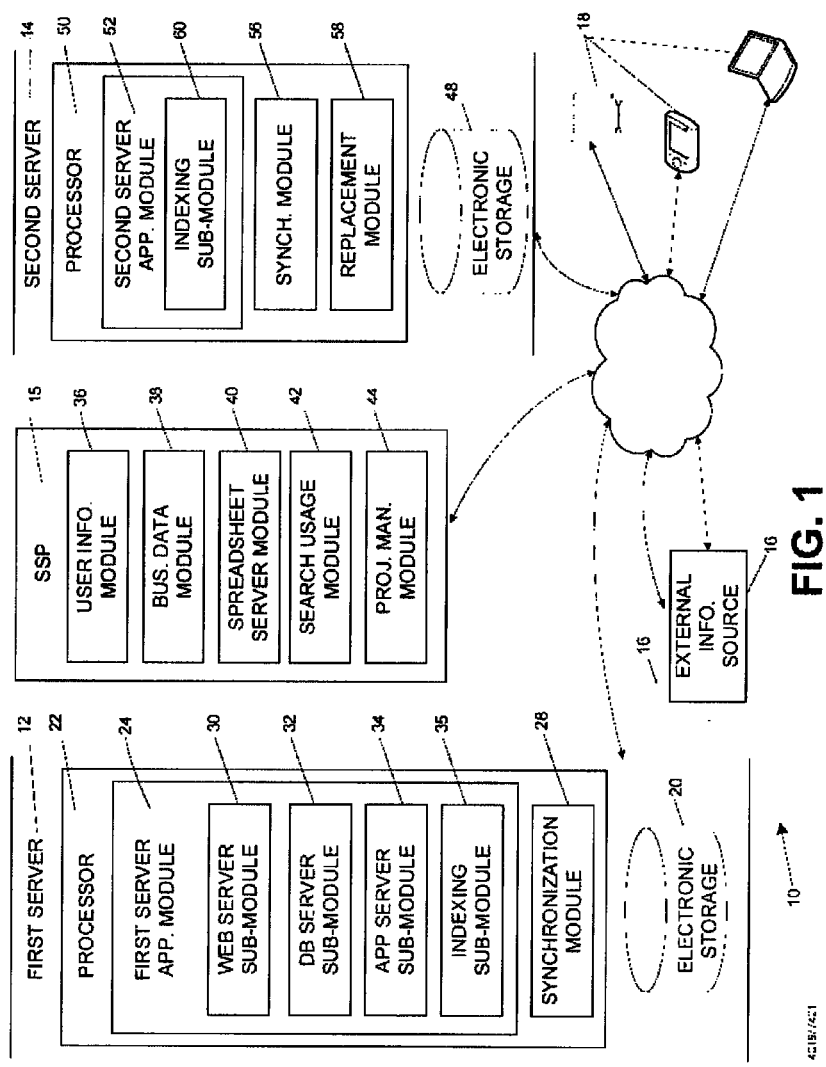
FIG. 1 illustrates a system configured to provide a suite of network-based services to users with high availability, according to one or more embodiments of the invention.

FIG. 1 illustrates a system 10 configured to provide a suite of network-based services to users with high availability. The suite of network-based services may include browser-based collaboration functions, process management functions, index and search functions, document-management functions, and/or other functions. The suite of network-based services may correspond to services provided by, for example, Microsoft® SharePoint™ software elements being executed on one or more processors. As used herein, the term "high availability" may refer a system design protocol that ensures a certain degree of operational continuity during a given measurement period. In some implementations, system 10 may include a first server 12, a second server 14, a shared service provider 15, and/or other components.

The system 10 may leverage one or more external information sources 16. Users may interface with system 10 and/or external information sources 16 via client computing platforms 18. The components of system 10, external information sources 16, and/or client computing platforms 18 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which system 10, external information sources 16, and/or client computing platforms 18 are operatively linked via some other communication media.

A given client computing platform 18 may include one or more processors configured to execute computer program modules. The computer program modules may be configured to enable one or more users associated with the given client computing platform 18 to interface with system 10 and/or external information sources 16, and/or provide other functionality attributed herein to client computing platforms 18. By way of non-limiting example, the given client computing platform 18 may include one or more of a desktop computer, a laptop computer, a handheld computer, a NetBook, a Smartphone, and/or other computing platforms.

The external information sources 16 may be configured to provide information to system 10. This information may include content, user information, information related to achievements or accomplishments of users, and/or other information.

As is described further below, first server 12, second server 14, and/or shared service provider 15 may cooperate to provide the network-based services to users of client computing platforms 18 via the network. For example, first server 12 and second server 14 may host the network-based services over the network to client computing platforms 18. In order to provide the network-based services with high availability, second server 14 may be configured as a back-up to first server 12 that replaces first server 12 in case of failover or switchover. Failover may include situations in which first server 12 fails in an unexpected manner. Switchover may include situations in which the switch from first server 12 to second server 14 is performed intentionally. For example, switchover may be executed to perform maintenance on first server 12, to test one or both of first server 12 and/or second server 14, and/or for other purposes.

Although first server 12, second server 14, and shared services provider 15 are each illustrated as a single entity in FIG. 1, this is not intended to be limiting. For example, first server 12 may include one or more computing platforms operating as a first set of one or more servers to provide functionality attributed herein to first server 12. The second server 14 may include one or more computing platforms operating as a second set of one or more servers to provide functionality attributed herein to second server 14. The shared services provider 15 may include one or more computing platforms operating in cooperation to provide the functionality attributed herein to shared services provider 15.

The first server 12 may include electronic storage 20, one or more processors 22, and/or other components. Electronic storage 20 may comprise electronic storage media that electronically stores information. The electronic storage media of electronic storage 20 may include one or both of system storage that is provided integrally (i.e., substantially non-removable) with first server 12 and/or removable storage that is removably connectable to first server 12 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may store software algorithms, information determined by processor 22, information received via the network, and/or other information that enables first server 12 to function properly. Electronic storage 20 may be a separate component within first server 12, or electronic storage 20 may be provided integrally with one or more other components of first server 12 (e.g., processor 22).

Processor 22 may be configured to provide information processing capabilities in first server 12. As such, processor 22 may include one or more of a digital processor, an analog processor, a digital circuit designed to process information, an analog circuit designed to process information, a state machine, and/or other mechanisms for electronically processing information. Although processor 22 is shown in FIG. 1 as a single entity, this is for illustrative purposes only. In some implementations, processor 22 may include a plurality of processing units. These processing units may be physically located within the same device, or processor 22 may represent processing functionality of a plurality of devices operating in coordination.

As is shown in FIG. 1, processor 22 may be configured to execute one or more computer program modules. The one or more computer program modules may include one or more of a first server application module 24, a synchronization module 28, and/or other modules. Processor 22 may be configured to execute modules 24 and/or 28 by software; hardware; firmware; some combination of software, hardware, and/or firmware; and/or other mechanisms for configuring processing capabilities on processor 22.

It should be appreciated that although modules 24 and 28 are illustrated in FIG. 1 as being co-located within a single processing unit, in implementations in which processor 22 includes multiple processing units, one or more of modules 24 and/or 28 may be located remotely from the other modules. The description of the functionality provided by the different modules 24 and/or 28 described below is for illustrative purposes, and is not intended to be limiting, as any of modules 24 and/or 28 may provide more or less functionality than is described. For example, one or more of modules 24 and/or 28 may be eliminated, and some or all of its functionality may be provided by other ones of modules 24 and/or 28. As another example, processor 22 may be configured to execute one or more additional modules that may perform some or all of the functionality attributed below to one of modules 24 and/or 28.

The first server application module 24 may be configured to provide a first instance of a server application. As used herein, the term "server application" may refer to one or more software elements that cooperate in an integrated manner to provide the network-based services associated with first server 12 to users. For example, the first server application module 24 may include the collection of software elements available from Microsoft® SharePoint™ 2007. The first server application module 24 may be configured such that the server application provides application programming interfaces through which first server application module 24 communicates with other computer program modules that are not an integral part of first server application module 24.

By way of non-limiting example, the cooperative software elements of the first instance of the server application provided by first server application module 24 may include a plurality of sub-modules that may be implemented in to provide the network-based services in an integrated and cohesive manner. The sub-modules may include one or more of a web server sub-module 30, a database server sub-module 32, an application server sub-module 34, a first indexing sub-module 35, and/or other sub-modules. It will be appreciated that in implementations in which first server 12 is implemented in a plurality of devices, various ones of sub-modules 30, 32, 34, and/or 35 may be implemented in different devices.

The web server sub-module 30 may be configured to perform the functionality of a front-end web server in serving content over the network via a network communication protocol (e.g., HTTP and/or other protocols). The content may include webpages. A webpage may include a document or resource that is accessible via a browser. These documents may be formatted in a mark-up format (e.g., HTML, XHTML, XML, and/or other mark-up formats). Serving the content may include receiving requests for content, receiving instructions for altering or calling content, and/or receiving other requests or instructions from client computing platform (s) 18, and then responding by providing the requested content (or locations of the requested content) to the requesting client computing platform(s) 18.

The database server sub-module 32 may be configured to provide database services to users of client computing platforms 18 via the network. This may include receiving database commands, queries, content, and/or other information related to a database, performing the requested actions and/or obtaining the requested information, and providing the results to the requesting client computing platform(s) 18.

The application server sub-module 34 may be configured to provide application server functionality to client computing platforms 18. This may include executing a plurality of different information processing tasks at the request of client computing platforms 18, and then returning the results to client computing platforms 18. For example, application server sub-module 34 may be configured to index content served by first server application module 24, may be configured to search for content served by first server application module 24, may be configured to perform calculations at the request of client computing platforms 18, and/or may be provided to host other application functions.

The indexing sub-module 35 may be configured to provide an indexing service to first server application module 24 (and/or other instances of the server application). As such, indexing sub-module 46 may index information served by first server application module 24, metadata related to information served by first server application module 24, information associated with one of the other Shared Services provided by shared services provider 15, and/or other information. The indexing sub-module 35 may crawl content, logs, and/or other information sources associated with first server application module 24 (and/or other instances of the server application), shared services provider 15, and/or other information and create an index in an ongoing manner. This index may be referenced to respond to queries and/or searches by users, administrators, for the functionality of shared services provided by shared services provider 15, and/or for other purposes.

In some implementations, shared service provider 15 (and/or some other of shared services provider) may be associated with a single indexing sub-module such as indexing sub-module 35 to obtain access to an index. However, indexing sub-module 35 may provide its index to a plurality of shared service providers and/or other modules or sub-modules. The shared service providers associated with indexing sub-module 46 (e.g., shared service provider 15) may store a locator (e.g., a network address, File Share locationi, and/or other locators) that point to indexing sub-module 35 so that they can access the index created and/or maintained by indexing sub-module 35 when needed.

This reliance of a plurality of shared service providers and/or other modules or sub-modules on indexing sub-module 35 alone may create issues when switchover or failover of indexing sub-module 35 occurs. Such switchover or failover may include switchover or failover of first server 12 as a whole, switchover or failover of first server application module 24, and/or other switchover or failover scenarios. The issues may be caused by one or more shared service providers, such as shared service provider 15, and/or other modules or sub-modules pointing to indexing sub-module 35 after the switchover or failover even after indexing sub-module 35 has been de-activated by virtue of the switchover or failover.

The shared services provider 15 may be configured to provide shared services to the server application. The shared services provided to the server application by shared services provider 15 may be services that are utilized across the web sites, web applications, and/or databases served by first server application module 24. In some implementations, shared services provider 15 may include the Shared Service Providers associated with Microsoft® SharePoint™ 2007, and/or other Microsoft® SharePoint™ releases. To provide the shared services, shared services provider 15 may include one or more processors configured to execute computer program modules. The computer program modules may include one or more of a user information module 36, a business data catalog module 38, a spreadsheet services module 40, a search usage module 42, a project management module 44, and/or other modules. (40) The user information module 36 may be configured to provide a user information service to first server application module 24 (and/or other instances of the server application). The user information service may include providing user profiles to first server application module 24. The user profiles may be imported from a directory service, and/or otherwise obtained. The content and/or functionality hosted by first server application module 24 may be customized, controlled for privacy purposes, and/or otherwise targeted or tailored for individual users based on the information included in the user profiles provided by user information module 36 to first server application module 24 (and/or other instances of the server application).

The business data catalog module 38 may be configured to provide a business data catalog service to first server application module 24 (and/or other instances of the server application). As such, business data catalog module 38 may provide a single, unified schema for information stored in line-of-business applications and/or documents hosted by first server application module 24 (and/or other instances of the server application).

The spreadsheet services module 40 may be configured to provide a spreadsheet calculation service to first server application module 24 (and/or other instances of the server application). The spreadsheet services module 40 may provide shared worksheets and/or some other mechanism by which business data associated with the content and/or functionality hosted by first server application module 24 can be analyzed.

The search usage module 42 may be configured to provide a search usage service for usage of the content and/or functionality hosted by first server application module 24 (and/or other instances of the server application). The search usage module 42 may aggregate and/or analyze information related to site usage, such as searches and/or queries entered to first server application module 24. This may include usage of content and/or functionality provided by first server application module 24, as a whole, or for only certain portions of the content and/or functionality (e.g., for a specific site or web application).

The project management module 44 may be configured to provide project management functionality across the content and/or functionality hosted by first server application module 24 (and/or other instances of the server application). For example, project management module 44 may include Microsoft® Project Web Access.

The synchronization module 28 may be configured to obtain configuration parameters of first server application module 24. The synchronization module 28 may transmit the configuration parameters to second server 14. The configuration parameters may include index parameters of an index of information and/or metadata created and/or maintained by indexing sub-module 35, identifications of one or more service providers, modules or sub-modules that refer to the index created and/or maintained by indexing sub-module 46 (e.g., shared services provider 15), and/or other information associated with the index created and/or maintained by indexing sub-module 35. The indexing parameters obtained and transmitted by synchronization module 28 may facilitate the duplication of the index on second server 14. The identifications of the one or more shared services providers, modules and/or sub-modules that refer to the index may include locators that provide access to the one or more shared services providers, modules and/or sub-modules, or may enable the appropriate locators to be obtained via some sort of look-up.

In some implementations, synchronization module 28 may be configured to obtain the configuration parameters through a background process executed on first server 12 that queries an application programming interface associated with first server application module 24. For example, synchronization module 28 may obtain the configuration parameters in accordance with the server configuration querying system and method described in U.S. patent application Ser. No. 12/718,543, filed Mar. 5, 2010, which is incorporated herein by reference.

The second server 14 may include electronic storage 48, one or more processors 50, and/or other components. Electronic storage 48 may comprise electronic storage media that electronically stores information. The electronic storage media of electronic storage 48 may include one or both of system storage that is provided integrally (i.e., substantially non-removable) with second server 14 and/or removable storage that is removably connectable to second server 14 via, for example, a port (e.g., a USB port, a firewire port, etc.) or a drive (e.g., a disk drive, etc.). Electronic storage 48 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 48 may store software algorithms, information determined by processor 50, information received via the network, and/or other information that enables second server 14 to function properly. Electronic storage 48 may be a separate component within second server 14, or electronic storage 48 may be provided integrally with one or more other components of second server 14 (e.g., processor 40).

Processor 50 may be configured to provide information processing capabilities in second server 14. As such, processor 50 may include one or more of a digital processor, an analog processor, a digital circuit designed to process information, an analog circuit designed to process information, a state machine, and/or other mechanisms for electronically processing information. Although processor 50 is shown in FIG. 1 as a single entity, this is for illustrative purposes only. In some implementations, processor 50 may include a plurality of processing units. These processing units may be physically located within the same device, or processor 50 may represent processing functionality of a plurality of devices operating in coordination.

As is shown in FIG. 1, processor 50 may be configured to execute one or more computer program modules. The one or more computer program modules may include one or more of a second server application module 52, a synchronization module 56, a replacement module 58, and/or other modules. Processor 50 may be configured to execute modules 52, 56, and/or 58 by software; hardware; firmware; some combination of software, hardware, and/or firmware; and/or other mechanisms for configuring processing capabilities on processor 22.

It should be appreciated that although modules 52, 56, and 58 are illustrated in FIG. 1 as being co-located within a single processing unit, in implementations in which processor 50 includes multiple processing units, one or more of modules 52, 56, and/or 58 may be located remotely from the other modules. The description of the functionality provided by the different modules 52, 56, and/or 58 described below is for illustrative purposes, and is not intended to be limiting, as any of modules 52, 56, and/or 58 may provide more or less functionality than is described. For example, one or more of modules 52, 56, and/or 58 may be eliminated, and some or all of its functionality may be provided by other ones of modules 52, 56, and/or 58. As another example, processor 50 may be configured to execute one or more additional modules that may perform some or all of the functionality attributed below to one of modules 52, 56, and/or 58.

The second server application module 52 may be configured to provide a second instance of the server application. For example, the second server application module 52 may include the collection of software elements available from Microsoft® SharePoint™ 2007. Similar to first server application module 24, second server application module 52 may be configured such that the second instance of the server application provides application programming interfaces through which second server application module 52 communicates with other computer program modules that are not an integral part of second server application module 52. The cooperative software elements of second instance of the server application provided by second server application module 52 may correspond to the cooperative software elements of the second instance of the server application provided by first server application module 24. As such, second server application module 52 may include one or more of a web server sub-module, a database server sub-module, an application server sub-module, and/or other sub-modules. The second server application module 52 may include a second indexing sub-module 60 that corresponds to indexing sub-module 35.

In some implementations, one or more of the sub-modules included in second server application module 52 may provide backup to one or more corresponding sub-modules of first server application module 24 in case of switchover or failover. For example, indexing sub-module 60 may provide backup for indexing sub-module 35. The backup for first server application module 24 provided by second server application 52 may be provided with high availability.

The synchronization module 56 may be configured to receive the some or all of the configuration parameters transmitted to second server 14 from synchronization module 28 of first server 12. These may include the indexing parameters related to the index created and/or maintained by indexing sub-module 35. The synchronization module 56 may provide the indexing parameters received from synchronization module 28 to indexing sub-module 60.

Indexing sub-module 60 may be configured to maintain an index according to the received indexing parameters. This index may provide a backup to the index created and/or maintained by indexing sub-module 35. The index maintained by indexing sub-module 60 may be maintained to accommodate switchover or failover of indexing sub-module 35 with high availability.

The replacement module 58 may be configured to ensure that upon failover or switchover, any shared services provider, modules or sub-modules previously referring to the index created and/or maintained by indexing sub-module 35 (e.g., shared services provider 15) will begin to refer to the index maintained by indexing sub-module 60. As such, replacement module 58 replaces the associations with indexing sub-module 35 in shared services provider 15, and/or any other shared services providers, modules and sub-modules with associations to indexing sub-module 60. This may include replacing a locator corresponding indexing sub-module 35 in shared services provider 15 and/or the other shared services providers, modules and/or sub-modules with a locator corresponding to indexing sub-module 60. The replacement module 58 may perform this replacement only for shared services providers, modules and/or sub-modules currently referencing indexing sub-module 35. This may be determined from the modules and/or sub-modules identified in the configuration information received at second server 14 from synchronization module 28 as referring to indexing sub-module 35.

Since the functionality provided by replacement module 58 is provided by the servers being activated during switchover or failover, the transition can be made from indexing sub-module 35 to indexing sub-module 60 even if the transition was not anticipated and/or impacts the processor executing indexing sub-module 35. Thus, the transition between indexing sub-module 35 and indexing sub-module 60 can be made with high availability.

It will be appreciated that the switchover or failover from indexing sub-module 35 to indexing sub-module 60 may only include the transition from indexing sub-module 35 to indexing sub-module 60. Or, the transition may include the switchover and/or failover of other components of system 10 from first server 12 to second server 14. For example, the switchover or failover may include transitioning first server application module 24 to second server application module 52, and/or other transitions.

Figure 2:
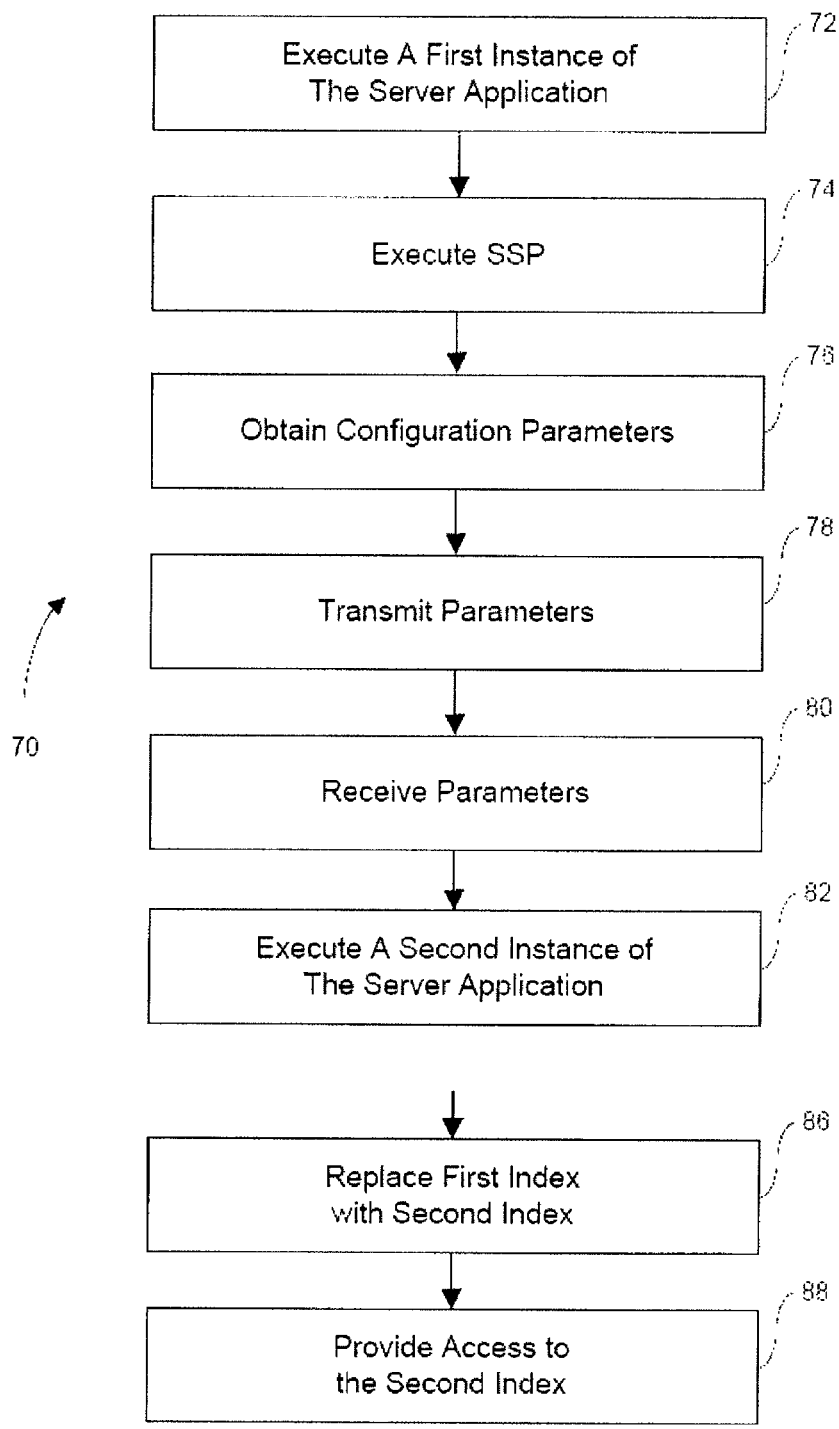
FIG. 2 illustrates a method of providing a suite of network-based services to users with high availability, in accordance with one or more embodiments of the invention.

FIG. 2 illustrates a method 70 of providing a server application with high availability. The operations of method 70 presented below are intended to be illustrative. In some embodiments, method 70 may be accomplished with one or more additional operations not described, and/or without one or more of the operations discussed. Additionally, the order in which the operations of method 70 are illustrated in FIG. 2 and described below is not intended to be limiting.

In some embodiments, method 70 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 70 in response to instructions stored electronically on an electronic storage medium. The one or more processing devices may include one or more devices configured through hardware, firmware, and/or software to be specifically designed for execution of one or more of the operations of method 70.

At an operation 72, a first instance of a server application may be executed on a first set of one or more servers. The server application may facilitate access and interaction of users with content and functionality served by the first set of one or more servers. The first set of one or more servers may be similar to or the same as first server 12 (shown in FIG. 1 and described above). The first instance of the server application may be similar to or the same as first server application module 24 (shown in FIG. 1 and described above). The first instance of the server application may include a first indexing service. The first indexing service may be configured to index information served by the first set of one or more servers, metadata related to the information served by the first set of one or more servers, and/or other information. The first indexing service may be similar to or the same as indexing sub-module 35 (shown in FIG. 1 and described above).

At an operation 74, a shared service provider may be executed. The shared service provider may be configured to provide shared services associated with the content and functionality served by the first set of one or more servers. The first shared service provider may be similar to or the same as shared services provider 15 (shown in FIG. 1 and described above).

At an operation 76, configuration parameters of the first set of one or more servers may be obtained on the first set of one or more servers. The configuration parameters may include one or more of indexing parameters of the index created and/or maintained by the first instance of the server application, identifications of one or more shared services providers, modules or sub-modules that refer to the index created and/or maintained by the first indexing service. Operation 76 may be performed by a synchronization module similar to or the same as synchronization module 28 (shown in FIG. 1 and described above).

At an operation 78, the configuration parameters obtained on the first set of one or more servers may be transmitted to a second set of one or more servers. The second set of servers may be similar to or the same as second server 14 (shown in FIG. 1 and described above). Operation 78 may be performed by a synchronization module similar to or the same as synchronization module 28 (shown in FIG. 1 and described above).

At an operation 80, the configuration parameters transmitted at operation 78 may be received at the second set of one or more servers.

At an operation 82, a second instance of the server application may be executed on the second set of one or more servers. The second instance of the server application may be similar to or the same as second server application module 52 (shown in FIG. 1 and described above). The second instance of the server application may provide a second indexing service configured to backup the first indexing service executed on the first set of one or more servers. The second indexing service may be configured to maintain an index in accordance with the indexing parameters obtained at the second set of one or more servers at operation 80. The second indexing service may be similar to or the same as indexing sub-module 60 (shown in FIG. 1 and described above).

At an operation 86, responsive to switchover or failover of the first instance of the server application to the second instance of the server application, replacement commands may be transmitted from the second set of one or more servers. The replacement commands may be transmitted to the shared services providers, modules and/or sub-modules that reference the index created and/or maintained by the first indexing service. The replacement commands may replace the first indexing service with the second indexing service in the receiving modules and/or sub-modules such that subsequent to reception of the replacement commands the modules and/or sub-modules begin to reference the second indexing service rather than the first indexing service. The replacement commands may be transmitted to the shared services providers, modules and/or sub-modules identified in the configuration parameters transmitted to the second set of one or more servers at operation 78. In one embodiment operation 86 may be performed by a replacement module similar to or the same as replacement module 58 (shown in FIG. 1 and described above).

At an operation 88, the index maintained by the second indexing service is used to satisfy queries to the second indexing service from modules and/or sub-modules that received replacement commands at operation 86.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a server application with high availability, the system comprising:
   a computing platform configured to act in coordination as a first server; and
   a computing platform configured to act in coordination as a second server,
   wherein the first server comprises a processor configured to execute a first set of computer program modules, the first set of computer program modules comprising:
   a first server application module configured to facilitate access and interaction of a user with content and functionality served by the first server application module, wherein the first server application module comprises a first indexing sub-module configured to index information served by the first server application module, and to index metadata related to the information served by the first server application module; and
   a first synchronization module configured to obtain configuration parameters of the first server application module, and to transmit the configuration parameters to the second server, wherein the configuration parameters include an index parameter of an index of information and metadata created by the first indexing sub-module, and include an identification of a shared services provider that refers to the index created by the first indexing sub-module; and
   wherein the second server comprises a processor configured to execute a second set of computer program modules, the second set of computer program modules comprising:
   a second server application module configured to serve as a backup to the first server application module, wherein the second server application module comprises a second indexing sub-module;
   a second synchronization module configured to receive the index parameter from the first synchronization module, and to provide the configuration parameters to the second indexing sub-module,
   wherein the second indexing sub-module is further configured to maintain an index according to the index parameter to accommodate switchover or failover of the first indexing sub-module to the second indexing sub-module; and
   a replacement module configured such that, responsive to switchover or failover from the first server application module to the second server application module, the replacement module replaces the first indexing sub-module with the second indexing sub-module in the shared services provider identified in the configuration parameters received from the first synchronization module.

2. The system of claim 1, wherein the first server application is configured to provide at least a first web server, a first application server, and a first database server.

3. The system of claim 1, further comprising the shared services provider, the shared services provider configured to provide shared services to the first server application module and the second server application module, wherein the shared services provider is configured to reference the index maintained by the first indexing sub-module prior to switchover or failover.

4. The system of claim 3, wherein the services provided by the shared services provider comprise one or more selected from: a user information service, a business data catalog service, a spreadsheet service, or a search usage service.

5. The system of claim 1, wherein the first synchronization module is configured to obtain the configuration parameters via an application programming interface provided by the first server application module.

6. The system of claim 5, wherein the second synchronization module is configured to provide the configuration parameters to the second indexing sub-module via an application programming interface provided by the second server application module.

7. The system of claim 5, wherein the first synchronization module is a background process.

8. The system of claim 1, wherein the first server application module is provided by Microsoft® Sharepoint™.

9. A method of providing a server application with high availability, wherein the method is implemented in a computer system comprising a computing platform configured to act in coordination as a first server and a computing platform configured to act in coordination as a second server, the method comprising:
   executing, using a processor of the first server, a first instance of a server application that facilitates access and interaction of a user with content and functionality served by the first server, wherein the first instance of the server application provides a first indexing service configured to index information served by the first server, and index metadata related to the information served by the first server;
   obtaining, using a processor of the second server, configuration parameters of the first instance of the server application, wherein the configuration parameters include an index parameter of an index of information and metadata created by the first indexing service, and an identification of a shared service provider that refers to the index created by the first indexing service;
   executing, on the second server, a second instance of the server application, wherein the second instance of the server application provides a second indexing service configured to maintain an index according to the index parameter from the first indexing service to accommodate switchover or failover of the first indexing service to the second indexing service; and
   responsive to switchover or failover of the first instance of the server application to the second instance of the server application, transmitting a replacement command from the second server that replaces the first indexing service with the second indexing service in the shared services provider.

10. The method of claim 9, wherein the first instance of the server application provides at least a first web server, a first application server, and a first database server.

11. The method of claim 9, wherein the shared service provider provides one or more selected from: a user information service, a business data catalog service, a spreadsheet calculation service, or a search usage service.

12. The method of claim 9, further comprising:
   obtaining the configuration parameters on the first server through an application programming interface associated with the first instance of the server application; and
   transmitting the obtained configuration parameters to the second server.

13. The method of claim 12, wherein the second indexing service receives the configuration parameters via an application programming interface associated with the second instance of the server application.

14. The method of claim 12, wherein obtaining the configuration parameters through an application programming interface associated with the first instance of the server application is a background process.

15. The method of claim 9, wherein the server application is provided by Microsoft® Sharepoint™.

* * * * *